US008004457B2

(12) United States Patent
Scott

(10) Patent No.: US 8,004,457 B2
(45) Date of Patent: Aug. 23, 2011

(54) ANTENNA CALIBRATION

(75) Inventor: Michael Andrew Scott, Cowes (GB)

(73) Assignee: BAE Systems plc, London (GB)

( * ) Notice: Subject to any disclaimer, the term of this patent is extended or adjusted under 35 U.S.C. 154(b) by 183 days.

(21) Appl. No.: 12/302,148

(22) PCT Filed: Aug. 8, 2008

(86) PCT No.: PCT/GB2008/050686
§ 371 (c)(1),
(2), (4) Date: Nov. 24, 2008

(87) PCT Pub. No.: WO2009/027725
PCT Pub. Date: Mar. 5, 2009

(65) Prior Publication Data

US 2010/0253570 A1 Oct. 7, 2010

(30) Foreign Application Priority Data

Aug. 31, 2007 (EP) .................................... 07253442
Aug. 31, 2007 (GB) .................................. 0716969.1

(51) Int. Cl.
*G01S 7/40* (2006.01)

(52) U.S. Cl. ........................ 342/174; 342/165; 342/173

(58) Field of Classification Search ................. 342/165, 342/173, 174
See application file for complete search history.

(56) References Cited

U.S. PATENT DOCUMENTS 5,001,675 A 3/1991 Woodward
5,235,342 A 8/1993 Orton et al.
5,253,188 A 10/1993 Lee et al.
5,530,449 A * 6/1996 Wachs et al. .................. 342/174
5,532,706 A * 7/1996 Reinhardt et al. ............ 343/778
5,572,219 A * 11/1996 Silverstein et al. ........... 342/375
5,657,023 A * 8/1997 Lewis et al. .................... 342/174
5,677,696 A * 10/1997 Silverstein et al. ........... 342/360
5,784,030 A * 7/1998 Lane et al. ..................... 342/373
5,809,063 A 9/1998 Ashe et al.
5,861,843 A * 1/1999 Sorace et al. ................. 342/372
5,864,317 A 1/1999 Boe et al.
5,867,123 A 2/1999 Geyh et al.

(Continued)

FOREIGN PATENT DOCUMENTS

EP 0 812 027 A2 12/1997

(Continued)

OTHER PUBLICATIONS

U.S. Official Action U.S. Appl. No. 12/303,469 dated Aug. 27, 2010.

(Continued)

*Primary Examiner* — Thomas H Tarcza
*Assistant Examiner* — Peter Bythrow
(74) *Attorney, Agent, or Firm* — Scully, Scott, Murphy & Presser, P.C.

(57) ABSTRACT

The present invention relates to antenna calibration for active phased array antennas. Specifically, the present invention relates to a built in apparatus for autonomous antenna calibration Accordingly, the present invention provides a method of continuous on-line monitoring of each element in an array antenna comprising the steps of: (i) transmitting known test signals to one or more elements of the array antenna; (ii) monitoring responses of the elements to the test signals; and (iii)comparing the response with expected responses for the elements to determine an operation condition of the elements.

4 Claims, 4 Drawing Sheets

U.S. PATENT DOCUMENTS

| | | | | | |
|---|---|---|---|---|---|
| 5,909,191 | A * | 6/1999 | Hirshfield et al. | 342/174 |
| 5,929,809 | A * | 7/1999 | Erlick et al. | 342/372 |
| 5,929,810 | A * | 7/1999 | Koutsoudis et al. | 342/373 |
| 5,977,930 | A * | 11/1999 | Fischer et al. | 343/853 |
| 6,037,898 | A * | 3/2000 | Parish et al. | 342/174 |
| 6,054,951 | A * | 4/2000 | Sypniewski | 342/465 |
| 6,084,545 | A | 7/2000 | Lier et al. | |
| 6,127,966 | A * | 10/2000 | Erhage | 342/174 |
| 6,157,343 | A * | 12/2000 | Andersson et al. | 342/371 |
| 6,163,296 | A | 12/2000 | Lier et al. | |
| 6,232,918 | B1 * | 5/2001 | Wax et al. | 342/360 |
| 6,252,542 | B1 | 6/2001 | Sikina et al. | |
| 6,339,399 | B1 * | 1/2002 | Andersson et al. | 342/372 |
| 6,356,233 | B1 | 3/2002 | Miller et al. | |
| 6,448,939 | B2 | 9/2002 | Maruta | |
| 6,480,153 | B1 * | 11/2002 | Jung et al. | 342/368 |
| 6,489,923 | B1 | 12/2002 | Bevan et al. | |
| 6,636,173 | B2 | 10/2003 | Graham | |
| 6,778,130 | B1 | 8/2004 | Bevan et al. | |
| 6,778,147 | B2 * | 8/2004 | Sanada et al. | 343/853 |
| 6,940,453 | B2 * | 9/2005 | Kim | 342/368 |
| 7,068,218 | B2 | 6/2006 | Göttl et al. | |
| 7,106,249 | B2 * | 9/2006 | Kubo et al. | 342/174 |
| 7,215,298 | B1 | 5/2007 | Fraschilla et al. | |
| 7,324,042 | B2 * | 1/2008 | Werntz et al. | 342/174 |
| 7,340,248 | B2 | 3/2008 | Kawasaki et al. | |
| 7,358,898 | B2 * | 4/2008 | Kennedy et al. | 342/417 |
| 7,362,266 | B2 * | 4/2008 | Collinson | 342/372 |
| 7,379,019 | B2 * | 5/2008 | Kennedy et al. | 342/417 |
| 7,405,696 | B2 * | 7/2008 | Kennedy et al. | 342/417 |
| 7,423,586 | B2 | 9/2008 | Schieblich | |
| 7,545,321 | B2 * | 6/2009 | Kawasaki | 342/368 |
| 2004/0032365 | A1 * | 2/2004 | Gottl et al. | 342/368 |
| 2004/0061644 | A1 | 4/2004 | Lier et al. | |
| 2004/0127260 | A1 * | 7/2004 | Boros et al. | 455/562.1 |
| 2004/0252752 | A1 * | 12/2004 | Kennedy et al. | 375/132 |
| 2006/0009162 | A1 * | 1/2006 | Tan et al. | 455/67.11 |
| 2006/0119511 | A1 * | 6/2006 | Collinson | 342/368 |
| 2006/0192710 | A1 * | 8/2006 | Schieblich | 342/368 |
| 2006/0273959 | A1 * | 12/2006 | Kawasaki | 342/368 |
| 2007/0293269 | A1 | 12/2007 | Kuwahara et al. | |

FOREIGN PATENT DOCUMENTS

| | | | |
|---|---|---|---|
| EP | 1 496 567 | A1 | 1/2005 |
| EP | 1 670 095 | A1 | 6/2006 |
| EP | 1 724 875 | A1 | 11/2006 |
| GB | 2 199 447 | A | 7/1988 |
| GB | 2 224 887 | A | 5/1990 |
| GB | 2 300 076 | A | 10/1996 |
| WO | WO 95/34103 | | 12/1995 |
| WO | WO 98/52248 | | 11/1998 |
| WO | WO 99/52173 | A3 | 10/1999 |
| WO | WO 99/54960 | A2 | 10/1999 |
| WO | WO 02/087009 | A1 | 10/2002 |
| WO | WO 2004/025321 | A1 | 3/2004 |
| WO | WO 2004025321 | A1 * | 3/2004 |

OTHER PUBLICATIONS

U.S. Official Action U.S. Appl. No. 12/301,939 dated Sep. 24, 2010.
Aumann, H. M. et al., Phased Array Antenna Calibration and Pattern Prediction Using Mutual Coupling Measurements, IEEE Transactions on Antennas and Propagation, Jul. 1989, pp. 844-850, vol. 37, No. 7.
GB Search Report dated Dec. 10, 2007.
European Search Report dated Oct. 11, 2007.
Preliminary Report on Patentability and Written Opinion dated Mar. 11, 2010.
European Search Report dated Jan. 24, 2008.
UK Search Report dated Nov. 16, 2007.
International Search Report and Written Opinion dated Sep. 17, 2008.
Extended European Search Report dated Jan. 30, 2008.
Official Action U.S. Appl. No. 12/302,073 dated Aug. 12, 2010.

* cited by examiner

PRIOR ART

ANTENNA CALIBRATION

The present invention relates to antenna calibration for active, phased array antennas. Specifically, the present invention relates to a built in apparatus for autonomous monitoring of the operational condition of the elements of an antenna array.

A known method of calibrating an array antenna is to use calibration coupler manifolds 150, as shown in FIG. 1, at each of the elements 140 in the array.

Referring to FIG. 1, there is shown a known antenna element comprising a receiver 110, array cabling 120 and various active components 130. A calibration signal from a central source is split many ways in the manifold and a nominally-equal proportion is coupled into each element channel at some point behind the radiating element. The signal level at the receiver(s) 110 can then be adjusted accordingly to produce the desired performance characteristics for the array antenna.

When using a calibration coupler, a portion of the element channel 140 is not included in the calibration process. One problem with calibration coupler manifolds 150 is that they are relatively large devices and so cause problems in the design of an array antenna which incorporates them. Another problem with calibration coupler manifolds 150 is that the coupling factors at each channel have individual variability which needs to be removed to achieve optimum performance, i.e. the accuracy of antenna calibration is limited to the extent that the individual manifold outputs are known.

Alternatively, another known method for calibrating an array antenna is to use an external scanner. This involves placing an external scanning apparatus in front of the array face and scanning the properties of each radiating element of the array in turn by moving the scanner over each radiating element and measuring the radiation it produces and/or receives. It has many moving parts which require maintenance, especially because the equipment usually operates in exposed environments as this is where equipment employing phased array antennas is usually operated. In addition, this is a slow process and requires normal use of the equipment to stop while calibration is performed.

Accordingly, the present invention provides a method of continuous on-line monitoring of each element in an array antenna comprising the steps of: (i) transmitting known test signals to one or more elements of the array antenna; (ii) monitoring responses of the elements to the test signals; and (iii)comparing the response with expected responses for the elements to determine an operation condition of the elements.

An advantage of the present invention is that the operational condition of the transmit/receive elements in an antenna array can be continuously monitored in the periods where it is not actively being used, while not precluding the array from active use as the monitoring signals may be interspersed among usual operational transmissions. Additionally, the present invention does not introduce extra equipment to the array, e.g. calibration coupler manifolds, that itself requires further calibration to prevent accuracy limitations.

Specific embodiments of the invention will now be described, by way of example only and with reference to the accompanying drawings that have like reference numerals, wherein.

Figure 1:
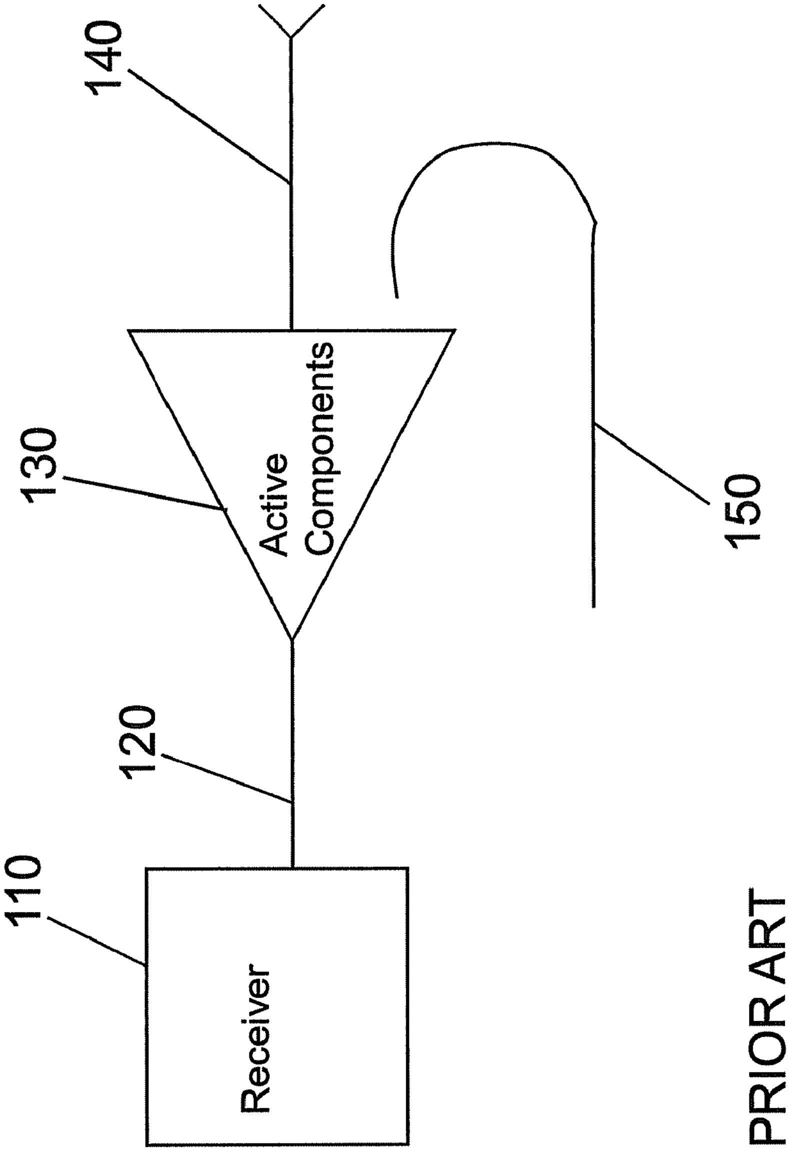
FIG. 1 is a schematic diagram of a known calibration coupler manifold.
Figure 2:
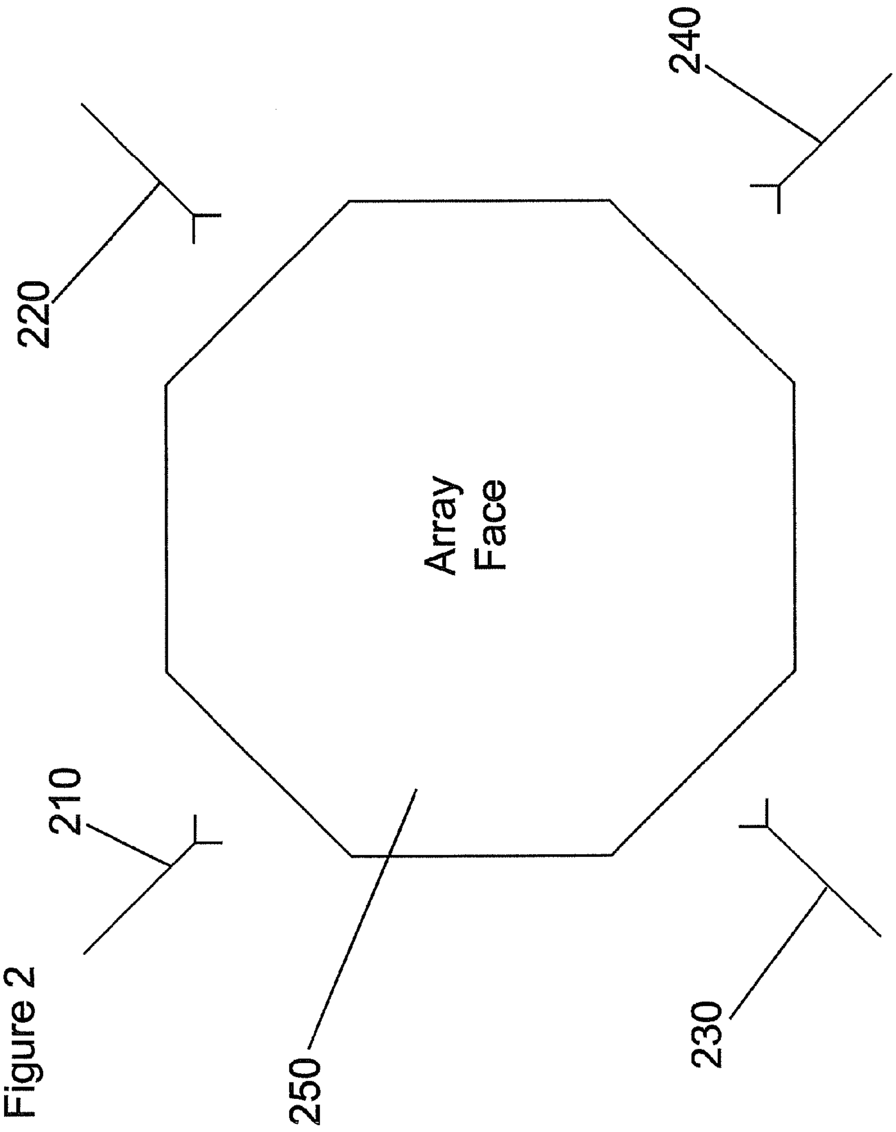
FIG. 2 is a diagram of an array face with four calibration antennas mounted around the edge of the array face according to a specific embodiment of the present invention.
Figure 3:
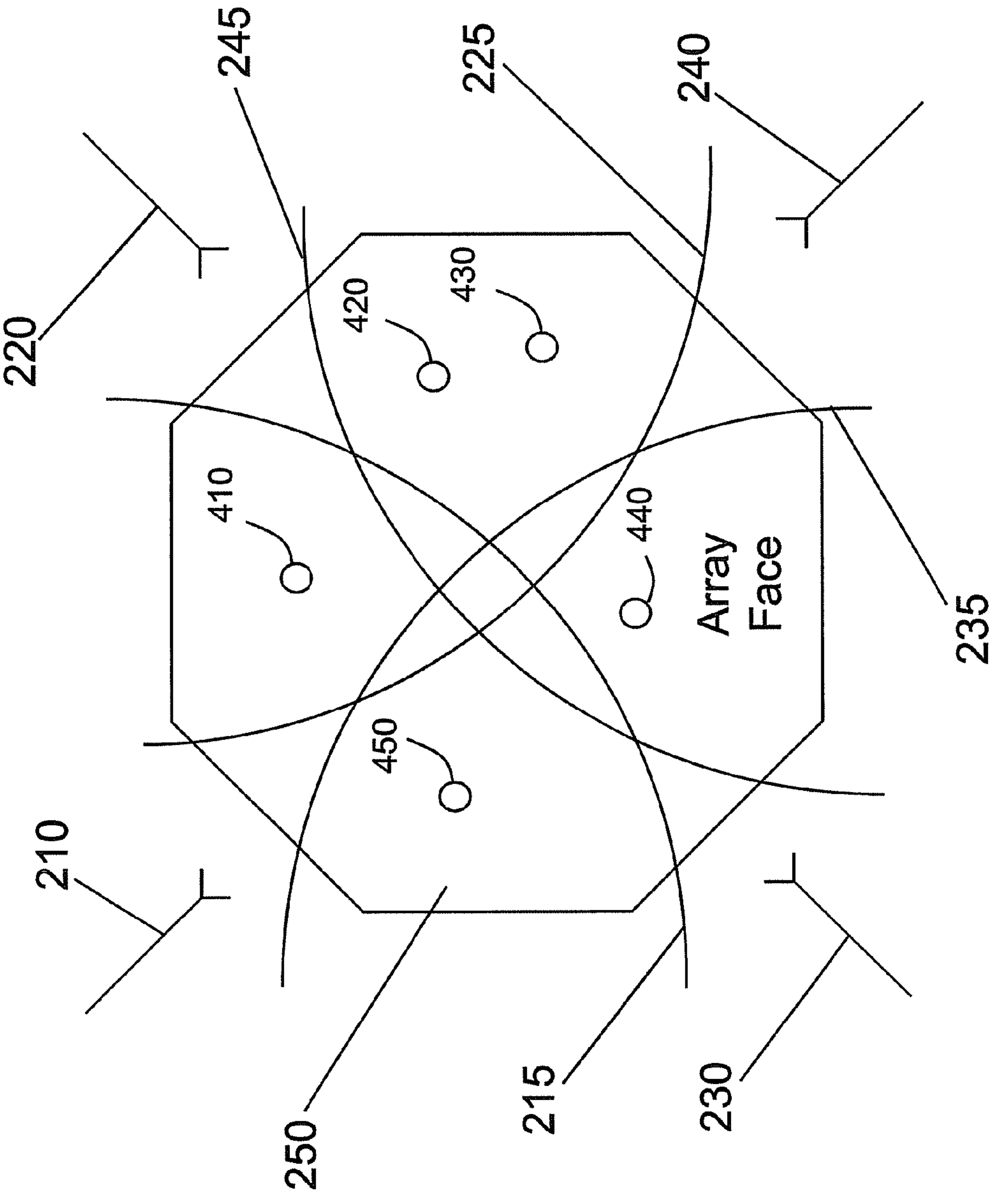
Figure 4:
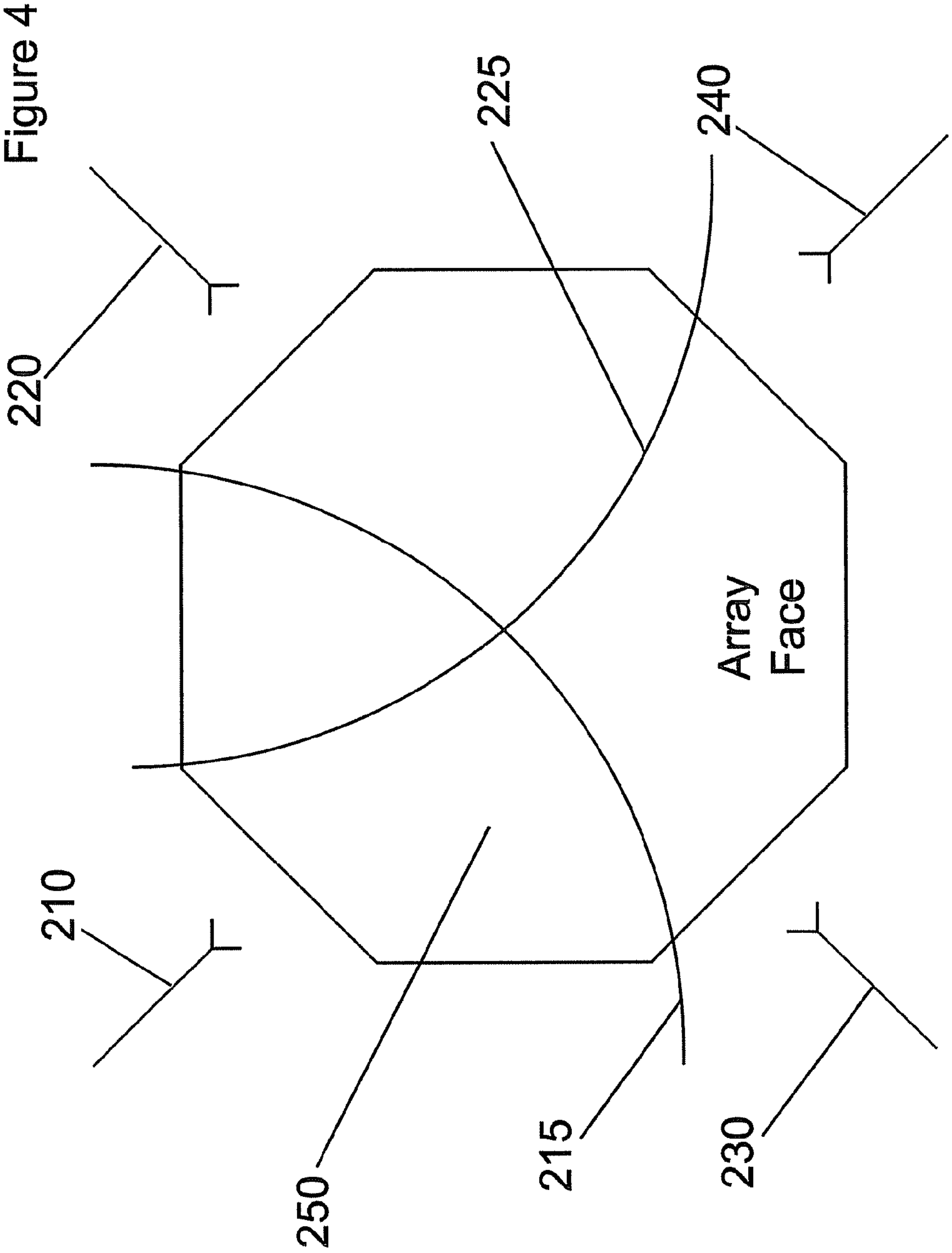

FIG. 3 is a diagram of an array face with four calibration antennas mounted around the edge of the array face showing the overlapping coverage areas of each calibration antennas according to a specific embodiment of the present invention; and FIG. 4 is a diagram of an array face with four calibration antennas mounted around the edge of the array face showing the overlapping coverage areas of two calibration antennas according to a specific embodiment of the present invention;

A first embodiment of the present invention will now be described with reference to FIGS. 2 to 4:

In FIG. 2, there is shown an array face 250 having four calibration antennas 210, 220, 230, 240 fixed at each corner of the array face 250. The calibration antennas 210, 220, 230, 240 are low directivity open wave guide antennas in fixed, known, locations around the array face 250. The calibration antennas 210, 220, 230, 240 are mounted to allow a degree of overlap in coverage area of the array face 250 such that all portions of the array face 250 are covered by at least one calibration antenna 210, 220, 230, 240.

In FIG. 3, an example of the overlap in coverage areas 215, 225, 235, 245 between all of the calibration antennas 210, 220, 230, 240 is shown—the entire array face 250 is covered by at least one calibration antenna 210, 220, 230, 240. In FIG. 4, the respective coverage areas 215, 225 of just two of the calibration antennas 210, 220 is shown.

Initially, the calibration antennas 210, 220, 230, 240 need to self-calibrate: this is performed in pairs, using the overlapping coverage areas between each pair, in turn, to check each calibration antenna 210, 220, 230, 240 against a common antenna element in the array face 250. The self-calibration method is as follows:

Three antenna elements 410, 420, 430 in the region of the array face 250 that is within range of the two calibration antennas 210, 220 to be calibrated are arbitrarily selected. For illustration, the following procedure is described with the elements in transmit mode; the same procedure is carried out in receive mode, with the transmit and receive roles of the elements and the calibration antennas reversed. Each antenna element 410, 420, 430 radiates a known signal in sequence. The radiated signals are detected by both calibration antennas 210, 220. The received signals at each calibration antenna 210, 220 are compared to that of the other respective calibration antenna 220, 210 and the known radiated signal. The process then repeats with a different pair of calibration antennas 220, 230, selecting different antenna elements 430, 440, 450 to radiate the known signal. Once all neighbouring pairs of calibration antennas 210, 220, 230, 240 have been through this process, a calibration coefficient for each calibration antenna 210, 220, 230, 240 is determined to produce the same output at each calibration antenna 210, 220, 230, 240 for a given input. The calibration coefficient is the difference between the desired signal and the achieved detected signal and once applied will align the gains and phases of the array.

The calibration process that occurs during normal operation repeats the as follows, with reference to FIG. 3:

For illustration, the following procedure is described with the elements in transmit mode; the same procedure is carried out in receive mode, with the transmit and receive roles of the elements and the calibration antennas reversed. Each antenna element in the array 250 radiates a known signal in sequence. The radiated signals are detected by a designated calibration antenna 210, for example, in whose quadrant the particular element is situated. The received signal at the calibration antenna 210 is compared to desired response to the known radiated signal. The process then repeats with all remaining elements in the array, selecting different calibration antennas

210, 220, 230, 240 to radiate the known signal. Once all elements have been through this process, a calibration coefficient for each element is determined to produce the desired output at each calibration antenna 210, 220, 230, 240 for a given input.

Each array has a first pass scan performed when it is first assembled at, for example, the factory that has assembled the array. This first pass scan creates one or more first pass coefficients for either portion of the array and/or the entire array. Using the calibration antennas mounted around the array, once these have been self-calibrated, the values for these coefficients can be computed.

In a second embodiment, by incorporating the fixed auxiliary radiators of the above embodiment at intervals around the periphery of the array, a means of coupling RF energy into the antenna elements from the array is introduced. Test signals may then be routed to each of these radiators in turn, which illuminate the array elements at high angles of incidence. The elements' responses to these test signals may then by used as a guide to their operational condition. The test signals may be interspersed during normal operational transmissions and hence offer a continuous on-line monitoring process.

In the systems of the first and second embodiments of the present invention, the full RF chain is tested, comprising active antenna element (including attenuator and phase shifter functions), beamformer, transmit output power, receive gain, and attenuator and phase shifter accuracy on every element can be monitored.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of continuous on-line monitoring of each element in an array antenna comprising a plurality of antenna elements forming an array face, the method comprising the steps of:

(i) mounting a plurality of calibration antennas around the periphery of the array face at a plurality of spaced locations from an edge of the array face;

(ii) transmitting known test signals from each of the calibration antennas in turn to one or more elements of the array antenna;

(iii) monitoring responses of the elements to the test signals; and (iv) comparing the response with expected responses for the elements to determine an operation condition of the elements.

2. A method of continuous on-line monitoring according to claim 1, wherein the calibration antennas are mounted such that the elements are illuminated at high angles of incidence.

3. A method of continuous on-line monitoring according to claim 1, wherein the test signals are interspersed during normal operation of the array antenna.

4. A method of continuous on-line monitoring according to claim 2, wherein the test signals are interspersed during normal operation of the array antenna.

* * * * *